United States Patent
Falby et al.

(10) Patent No.: US 8,782,638 B2
(45) Date of Patent: Jul. 15, 2014

(54) EXECUTION PATHWAY FOR INTERFACING WITH LEGACY PROGRAMS IN A MAINFRAME ENVIRONMENT

(75) Inventors: Walter Falby, Bloomfield Township, MI (US); Gary J. Michalek, Northville, MI (US)

(73) Assignee: Compuware Corporation, Detroit, MI (US)

( * ) Notice: Subject to any disclaimer, the term of this patent is extended or adjusted under 35 U.S.C. 154(b) by 137 days.

(21) Appl. No.: 13/300,026

(22) Filed: Nov. 18, 2011

(65) Prior Publication Data

US 2013/0132947 A1    May 23, 2013

(51) Int. Cl.
*G06F 9/455* (2006.01)
(52) U.S. Cl.
CPC ..................................... *G06F 9/455* (2013.01)
USPC .............................................. 718/1; 717/118
(58) Field of Classification Search
None
See application file for complete search history.

(56) References Cited

U.S. PATENT DOCUMENTS

| | | | | |
|---|---|---|---|---|
| 6,332,168 B1 * | 12/2001 | House et al. | ................... | 719/331 |
| 6,691,302 B1 * | 2/2004 | Skrzynski et al. | ............ | 717/118 |
| 7,552,302 B1 * | 6/2009 | Tene et al. | ...................... | 711/167 |
| 2004/0015849 A1 * | 1/2004 | Sanchez, II | ................... | 717/116 |
| 2004/0040032 A1 * | 2/2004 | Kyriakides et al. | ............ | 719/328 |
| 2004/0133893 A1 * | 7/2004 | Carbone et al. | ............... | 718/107 |
| 2004/0261065 A1 * | 12/2004 | Abrams et al. | ................ | 717/140 |
| 2005/0086640 A1 * | 4/2005 | Kolehmainen et al. | ....... | 717/120 |
| 2005/0229189 A1 * | 10/2005 | McManus | ..................... | 719/330 |
| 2006/0123067 A1 * | 6/2006 | Ghattu et al. | ................. | 707/203 |
| 2006/0130003 A1 * | 6/2006 | Dasari et al. | .................. | 717/131 |
| 2006/0195508 A1 * | 8/2006 | Bernardin et al. | ............ | 709/203 |
| 2006/0242634 A1 * | 10/2006 | Fleischer et al. | .............. | 717/148 |
| 2008/0250493 A1 * | 10/2008 | Bassani et al. | .................. | 726/17 |
| 2009/0271771 A1 * | 10/2009 | Fallows | ......................... | 717/137 |
| 2010/0005481 A1 * | 1/2010 | Lewis et al. | ................... | 719/320 |
| 2010/0058296 A1 * | 3/2010 | Nattinger | ...................... | 717/125 |
| 2010/0174690 A1 * | 7/2010 | Marcotte | ....................... | 707/695 |
| 2010/0192124 A1 * | 7/2010 | Hall et al. | ...................... | 717/106 |
| 2012/0117553 A1 * | 5/2012 | Kielstra et al. | ................ | 717/163 |
| 2012/0167067 A1 * | 6/2012 | Low et al. | ...................... | 717/148 |

OTHER PUBLICATIONS

"Calling Java from C", Java Developer's Journal, Michael Havey, Aug. 2004, p. 1-9.*
z/OS V1 R11.0 Language Environment Programming Guide z/OS V1R10.0-V1R11.0, Apr. 2010, p. 527.*
Java programming with JNI (John Stricker) IBM Tutotrial (Mar. 26, 2002). Available online www.ibm.com/developerworks/java/tutorials/j-jni/.*
IBM SDK for z/OS platforms, Java Technology Edition, version 6 (2008).*
"The Java Native Interface on z/OS", http://www.minframezone.com, Dec. 1, 2010.

* cited by examiner

*Primary Examiner* — Emerson Puente
*Assistant Examiner* — Mehran Kamran
(74) *Attorney, Agent, or Firm* — Harness, Dickey & Pierce, P.L.C.

(57) ABSTRACT

A computer-implemented method is provided for creating an execution path for interfacing with legacy programs in a mainframe computing environment. The method includes: creating a run-time environment for programs on a mainframe computer by an initiator program; initiating execution of a configuration program in the run-time environment by the initiator program, where the configuration program is written in the high level programming language; specifying user-defined parameters for a Java Virtual Machine to the configuration program; and creating a Java Virtual Machine in another run-time environment of the mainframe computer, where the JVM is created by the configuration program using the user-defined parameters.

17 Claims, 4 Drawing Sheets

US 8,782,638 B2

EXECUTION PATHWAY FOR INTERFACING WITH LEGACY PROGRAMS IN A MAINFRAME ENVIRONMENT

FIELD

The present disclosure relates to an execution pathway for interfacing with legacy programs in a mainframe environment.

BACKGROUND

In distributed computing environments, certain software applications are intended to run in multiple environments. Software developers may write these software applications for each operating environment. To minimize this duplicative effort, software developers have turned to high-level programming languages, such as C or C++. Unfortunately, environmental differences between operating systems manifest themselves in the programming language and make this approach less viable. However, with the advent of the Java programming language and its 'write once, run anywhere' paradigm, the landscape has changed. Of interest, Java provided mainframe developers with a new tool for extended functionality of legacy programs in a mainframe computing environment. The challenge remained of how to integrate Java into the mainframe computing environment.

Therefore, it is desirable to develop techniques for creating an execution pathway for interfacing with legacy programs in a mainframe computing environment. This section provides background information related to the present disclosure which is not necessarily prior art.

SUMMARY

A computer-implemented method is provided for creating an execution path for interfacing with legacy programs in a mainframe computing environment. The method includes: creating a run-time environment for programs on a mainframe computer by an initiator program; initiating execution of a configuration program in the run-time environment by the initiator program, where the configuration program is written in the high level programming language; specifying user-defined parameters for a Java Virtual Machine to the configuration program; and creating a Java Virtual Machine in the run-time environment of the mainframe computer, where the JVM is created by the configuration program using the user-defined parameters.

In one aspect, user-defined parameters are read from a text file by the configuration program, including a first path to Java itself and a second path to Java executables.

In another aspect, error handling by the run-time environment for the legacy program is disabled by the initiator program.

In yet another aspect, the configuration program using a Java Native Interface (JNI) to invoke Java methods, such that the configuration program detects an error reported by the JNI and outputs the detected error to a data file defined by a script program executed by the operating system of the mainframe computer.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 3:
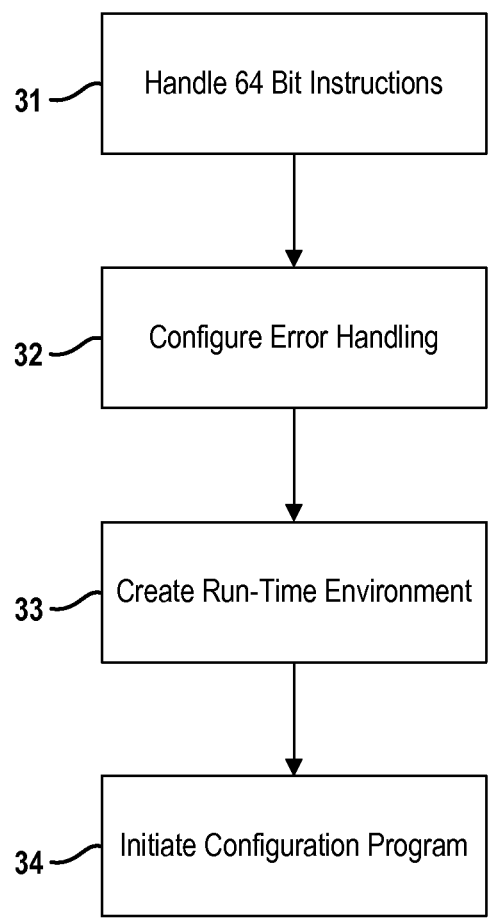
Figure 4:
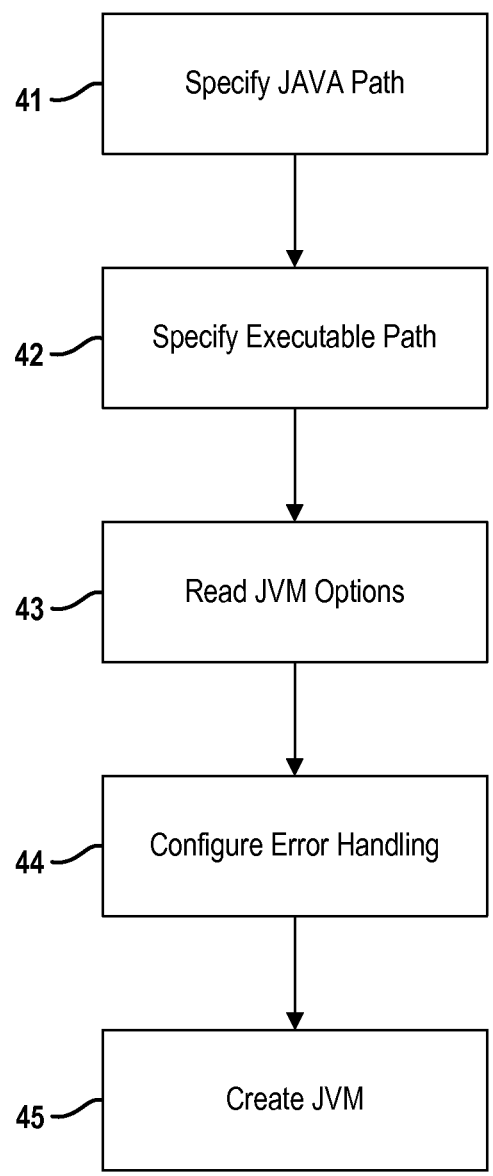

FIG. 3 is a flowchart illustrating the processing steps implemented by the initiator program; and FIG. 4 is a flowchart illustrating the processing steps implemented by the configuration program; and The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
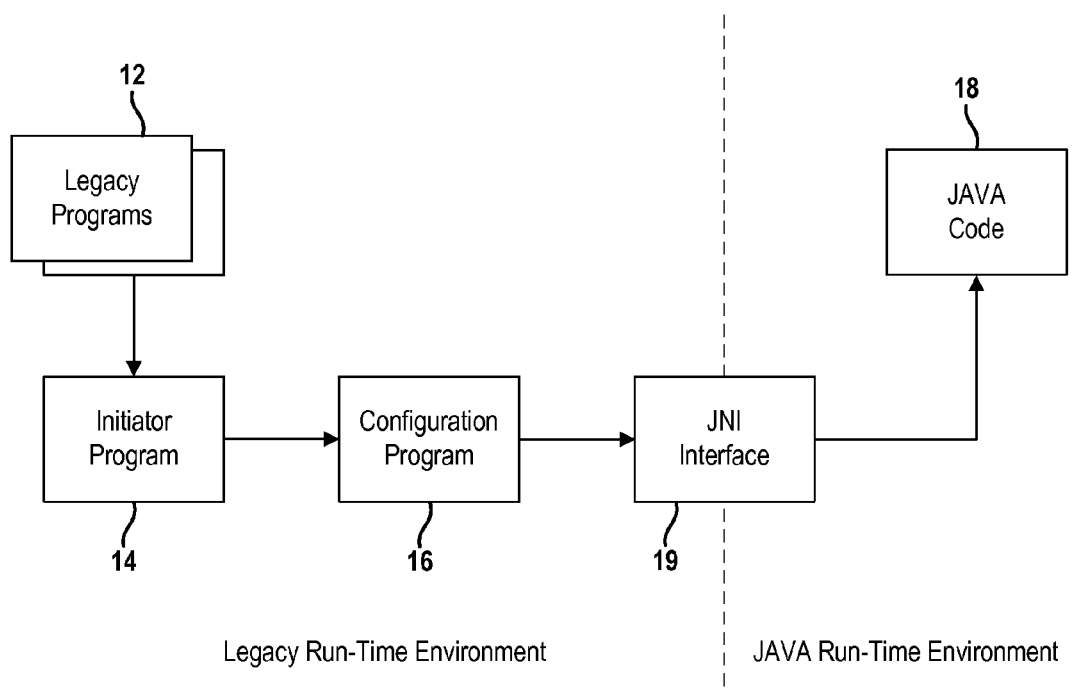
FIG. 1 is a diagram depicting an exemplary computing environment in a mainframe computer.

FIG. 1 depicts an exemplary computing environment 10 in a mainframe computer. The computing environment 10 can be segmented generally into a legacy runtime environment 6 and a Java runtime environment 8. In an exemplary embodiment, the legacy run-time environment 6 is further defined as the Language Environment (LE) which is supplied as an element of the z/OS operating system although other types of run-time environments and/or operating systems are contemplated by this disclosure. While reference is made throughout this disclosure to a computing environment commonly found on an IBM mainframe computer, it is readily understood that the concepts described herein are extendable to other types of mainframe computers and computing environments.

One or more legacy computer programs 12 may be executed in the legacy runtime environment 6. In the exemplary embodiment, the legacy programs are written, for example, in SAS/C or Assembler programming languages. The legacy run-time environment 6 can further include an initiator program 14 and a configuration program 16. The initiator program 14 and the configuration program 16 operate to create an execution pathway for interfacing with the legacy programs 12 as further described below.

In the exemplary embodiment, the Java runtime environment 8 is further defined as the UNIX System Services which is another supported component of the z/OS operating system. UNIX System Services allows software applications 18 from other platforms to run on the IBM platform. In this example, the software applications 18 are written in the JAVA programming language although other types of programming languages are supported in this environment. Likewise, other types of run-time environments may be implemented in place of the UNIX System Services.

Figure 2:
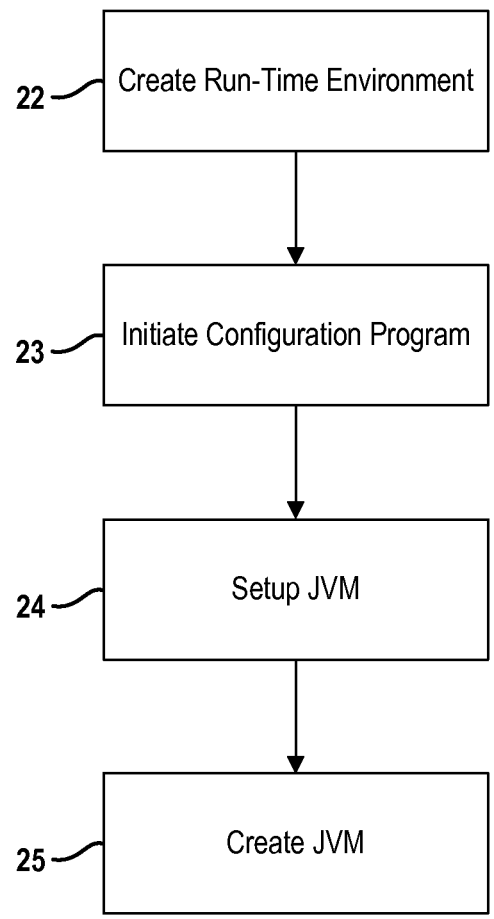
FIG. 2 is a flowchart illustrating an exemplary technique for creating an execution path that interfaces with legacy programs in a mainframe environment.

FIG. 2 illustrates an exemplary technique for creating an execution path between a legacy program 12 and a Java program 18 running in a mainframe computing environment 10. First, a run-time environment for programs written in a high level programming language is created at 22 in the computing environment. In an exemplary embodiment, the run-time environment is the Language Environment (LE) supported by the z/OS operating system. The run-time environment is created by the initiator program 14.

Once the run-time environment 6 has been created, the initiator program 14 initiates execution of the configuration program 16 as indicated at 23, where the configuration program 16 is written in a high level programming language such as C. The configuration program 16 executes in the newly created run-time environment 6 and continues building the execution pathway for interfacing with the legacy programs 12.

In the exemplary embodiment, the legacy programs are interfaced with Java methods. The configuration program 16 is responsible primarily for setup and creation of a Java Virtual Machine (JVM). The configuration program 16 enables a user at 24 to setup the environment for the JVM. For example, the configuration program 16 enables a user to select the particular Java they want to use, set options for the JVM and specify an appropriate level of problem determination for the programs comprising the execution pathway as will be further described below. The JVM is then created at 25 by the configuration program using the user specified parameters, thereby establishing an execution pathway between the legacy programs 12 and the Java methods 18. While reference is made to Java and its JVM, it is readily understood that the techniques for creating an execution path may be extended beyond Java to other computing languages which are supported by other types of applicable virtual machines. Thus, the execution path may interface application programs written in programming languages other than Java to the legacy programs residing in the mainframe computing environment.

Processing steps implemented by the initiator program 14 are further described in relation to FIG. 3. In the exemplary embodiment, the initiator program 14 uses the pre-initialization (PIPI) services of the Language Environment to create and terminate a high-level language environment. It is noted that the PIPI services do not restore high halves of registers. Therefore, the initiator program 14 can be configured to support legacy programs that use 64 bit instructions, such as a legacy program written in SAS/C. To do so, the initiator program 14 initializes a memory space that can be used to store the high halves of registers. Upon receiving a call from a legacy program that uses 64 bit instructions, the high halves of the registers are saved in the memory space allocated by the initiator program 14. When control is passed back to the legacy program 12, the high halves of the registers can be restored by the initiator program 14 from the memory space. In this way, the initiator program 14 handles legacy programs that use 64 bit instructions as indicated at 31. Exemplary psuedocode for allocating the memory space and saving of the high halves of the registers is provided below.

Obtain memory to hold register contents.
Store caller's save area address.
Save high halves of caller's registers.
Set save area format value.

It is understood that such functionality is not required for legacy programs using 31 bit instructions and therefore may not be executed by or incorporated into the initiator program 12.

Prior to creating the Language Environment, the initiator program 14 may also configure how error handling is performed in the legacy run-time environment 5. In the exemplary embodiment, error handling logic of the Language Environment gets control when a legacy program 12 running in this environment encounters an error condition (e.g., ABEND). Consequently, the cause of the error may be hidden from a user. Should a given legacy program 12 have its own error handling, the error handling by the Language Environment can be disabled at 32 by the initiator program 14. When an error condition is encountered by the legacy program 12, the error handling of the legacy program 12 gets control and processes the error. In one embodiment, enabling or disabling error handling by the Language Environment is dictated by a user defined parameter in a configuration file accessible by the initiator program 14. The initiator program 14 in turn reads the file and passes the parameter as a runtime parameter during the creation of the Language Environment. Depending on the run-time environment, other techniques for configuring error handling are contemplated by this disclosure.

The initiator program 14 then creates at 33 a run-time environment for the configuration program 16. In the exemplary embodiment, the pre-initialization (PIPI) services of the Language Environment are used to create and terminate a high-level language environment. Exemplary psuedocode for initializing the HLL by the initiator program 14 is provided below.

Load LE PIPI program.
Save address of loaded program.
Set initial values for creating high level language environment.
Call PIPI program to create HLL environment.

Again, other techniques for creating the run-time environment may be employed depending on the type of run-time environment.

Lastly, the initiator program 14 initiates at 34 execution of the configuration program 16 in the newly created run-time environment 6. In the exemplary embodiment, this is done using the PIPI services of Language Environment. PIPI provides a method for naming the module to be invoked and passing parameters to that module. That same interface allows the invoked module to return a value that's indicative of the result of its execution.

Processing step implemented by the configuration program 16 are further described in relation to FIG. 4. The configuration program 16 is responsible primarily for setting up the Java Virtual Machine (JVM). In an exemplary embodiment, parameters for configuring the JVM are defined in one or more text files which are read by the configuration program 16, where each file contains a different parameter type. For example, there may be four different input files. Exemplary data contained in these files may include but is not limited to the path to the Java executables, the path to the disguise jar files, the JVM options, and the output path for error reporting handling. Parameters may be specified in more or less files in other implementations. By specifying the parameters in text files, the user can configure how the JVM is implemented by the configuration program 16.

In an exemplary embodiment, the configuration program first sets the path to the Java itself as indicated at 41. The configuration program then builds the path to the Java executables as indicated at 42. In each case, the paths are specified by the user and read from a text file by the configuration program.

Likewise, other options for configuring the JVM are read from a text file at 43 by the configuration program. For illustration purposes, two example JVM options are: verbose: sizes and Dfile.encoding=UTF-8. The first option configures the JVM to write out values for a number of JVM options including the initial heap size, initial memory size and initial thread stack size. The second option configures the JVM to use UTF-8 encoding for text. These two options have been provided for illustration purposes. It is readily understood that other types of JVM options may be specified in the text file by a user and this fall within the scope of this disclosure.

Each of these parameters are in turn used at 45 by the configuration program to create the JVM. More specifically, the parameters may be passed into the CreateJavaVM function. Once the JVM is successfully created, various Java classes and method IDs are acquired. Exemplary pseudocode for starting the JVM in accordance with this approach is set forth below.

Read messaging and error logging options.
Build class path—where the application jar files live.
Set class path in JVM options list.
Read user supplied JVM options.
Set user values in JVM options list.
Set JVM version value.
Set option count value.
Create JVM using the set options.

Of note, building the class path requires reading the directory where the application jar files reside. The function creates a string that contains the names of all of the jar files and that string is concatenated to the class path JVM option. In the exemplary embodiment, a more conventional wild carding approach did not work and this alternative solution was needed to pass this data to the create JVM function. The read user supplied JVM options function reads any additional JVM options users might want to add when configuring the JVM.

Java Native Interface 19 (JNI) is a programming framework that enables Java code running in a JVM to call and to be called by applications written in other computer languages. Thus, the configuration program 16 uses the JNI 19 to invoke Java methods. In the exemplary embodiment, the method ID is used by the configuration program 16 to invoke a Java method, where the IDs are obtained from the Java class. In order to get the ID for a given Java method, one must know the method signature. The signature is the method name, exactly as it is in the class. It also includes the inputs to the method and any output. In the example below, the method name is 'info'.

```
infoLogLvl = (*env)->GetMethodID(env, loggerClass, "info",
    "(Ljava/lang/String;)V");
```

The input to this method is a Java string. Its output is a void or nothing. The javap program is executed against a class and displays the signatures for all methods in that class and should be used to determine the signature of all methods.

It is important to check the return from every JNI function call. Called methods may throw an exception or return a value indicating the call failed. In the example below, the FindClass function is called.

```
jclass clazz = (*env)->FindClass(env,
    "com/compuware/dataprivacy/disguiseengine/\
dpinterface/utils/MainframeUtils");
    if (((*env)->ExceptionCheck(env) == JNI_FALSE) && (clazz !=
    NULL))
```

The code checks to see if an exception was thrown and a valid value returned. The ExceptionCheck function returns a TRUE value if an exception was detected. The FindClass function returns a NULL value if the class was not found. The JNI specifications are checked for the details for each call. When calls are made to application methods, one should know if the method can throw an exception and what it returns.

With continued reference to FIG. 4, the configuration program 16 also configures at 44 the level of error reporting by the configuration program 16. Of note, standard error reporting of the JNI processing does not work in this environment. Thus, the configuration program 16 redirects output from the standard error reporting of the JNI processing to a Data Definition statement in the JCL running the particular job. In this way, the configuration program 16 is able to report errors detected in the JNI processing while relying upon the standard error reporting code in the JNI.

Once the execution path has been established, the legacy programs 12 can execute Java methods and vice versa. During execution, only a few instructions are executed by the initiator program 14. The configuration program 16 operates to manipulate the data passed by the legacy programs 12 so that it is in the format expected by the Java code 18. The configuration program 16 then invokes the appropriate Java methods. Upon returning from those methods, the configuration program 16 may manipulate the returned data so that is in a format expected by the legacy program 12.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for creating an execution path for interfacing with a legacy program that is unable to create a Java Virtual Machine in a mainframe computing environment, comprising:
   initiating execution of an initiator program using a script program executed by a z/OS operating system of a mainframe computer;
   creating, by the initiator program, a first run-time environment for programs on the mainframe computer, where the creation of the runtime environment uses pre-initialization (PIPI) services of a Language Environment component of the z/OS operating system;
   initiating execution of a configuration program in the first run-time environment by the initiator program, where the configuration program is written in a high level programming language that differs from the programming language of the legacy program;
   specifying user-defined parameters for a Java Virtual Machine to the configuration program;
   creating, by the configuration program, a Java Virtual Machine (JVM) in second run-time environment of the mainframe computer, where the JVM is created by the configuration program using the user-defined parameters and the second run-time environment differs from the first run-time environment; and
   executing the legacy program in the first run-time environment, where the legacy program passes data to the configuration program which in turn invokes a Java method.

2. The computer-implemented method of claim 1 wherein creating a run-time environment further comprises initializing a Language Environment supported by the z/OS operating system.

3. The computer-implemented method of claim 1 further comprises disabling error handling by the run-time environment for the legacy program.

4. The computer-implemented method of claim 1 further comprises allocating a memory space by the initiator program; receiving by the initiator program an instruction from the legacy program; and storing a portion of the instruction in the memory space for subsequent retrieval.

5. The computer-implemented method of claim 1 wherein specifying user-defined parameters further comprises specifying a first path to Java itself, specifying a second path to executables for Java; and creating the Java Virtual Machine using the first and second paths.

6. The computer-implemented method of claim 1 wherein specifying user-defined parameters further comprises reading the user-defined parameters by the configuration program from a text file.

7. The computer-implemented method of claim 1 wherein the configuration program uses a Java Native Interface (JNI) to invoke Java methods.

8. The computer-implemented method of claim 1 further comprises initiating execution of the initiator program using a script program executed by an operating system of the mainframe computer, detecting by the configuration program an error as reported by the JNI, and outputting the detected error to a data file defined by the script program.

9. The computer-implemented method of claim 1 wherein the another run-time environment is further defined as a UNIX System Services component of the z/OS operating system.

10. A computer-implemented method for creating an execution path for interfacing with legacy programs in a mainframe computing environment, comprising:
    initiating execution of an initiator program using Job Control Language executed by a z/OS operating system of the mainframe computer;
    creating, by the initiator program, a run-time environment on a mainframe computer executing the z\OS operating system;
    initiating, by the initiator program, execution of a configuration program in the run-time environment of the mainframe computer, where the configuration program is written in the high level programming language that differs from the programming language of the legacy program;
    specifying user-defined parameters for a Java Virtual Machine to the configuration program;
    creating, by the configuration program, a Java Virtual Machine (JVM) in another run-time environment of the mainframe computer, where the JVM is created by the configuration program using the user-defined parameters;
    invoking Java methods by the configuration program via a Java Native Interface (JNI) associated with the JVM; and
    detecting an error reported by the JNI and outputting the detected error by the configuration program to a data file defined by the Job Control Language.

11. The computer-implemented method of claim 10 further comprises creating the run-time environment using pre-initialization (PIPI) services of a Language Environment component of a z/OS operating system to create the run-time environment.

12. The computer-implemented method of claim 11 further comprises disabling error handling by the Language Environment for the legacy program.

13. The computer-implemented method of claim 10 further comprises allocating a memory space by the initiator program; receiving by the initiator program an instruction from the legacy program; and storing a portion of the instruction in the memory space for subsequent retrieval.

14. The computer-implemented method of claim 10 wherein specifying user-defined parameters further comprises specifying a first path to Java itself, specifying a second path to executables for Java; and creating the Java Virtual Machine using the first and second paths.

15. The computer-implemented method of claim 14 wherein specifying user-defined parameters further comprises reading the user-defined parameters by the configuration program from a text file.

16. A computer-implemented method for creating an execution path for interfacing secondary application programs with a legacy program in a mainframe computing environment, comprising:
   creating, by an initiator program, a run-time environment for programs on a mainframe computer executing a z/OS operating system, where the creation of the run-time environment uses pre-initialization (PIPI) services of a Language Environment component of the z/OS operating system;
   initiating execution of a configuration program in the run-time environment by the initiator program, where the configuration program is written in the high level programming language;
   specifying user-defined parameters for a virtual machine to the configuration program; and
   creating a virtual machine to support execution of the secondary application programs in another run-time environment of the mainframe computer, where the virtual machine is created by the configuration program using the user-defined parameters and the secondary application programs are written in a programming language that is different than the high level programming language of the configuration program.

17. The computer-implemented method of claim 16 wherein specifying user-defined parameters further comprises specifying a first path to the virtual machine itself, specifying a second path to executables associated with the virtual machine; and creating the virtual machine using the first and second paths.

* * * * *